(12) United States Patent
Siddle

(10) Patent No.: US 9,191,544 B2
(45) Date of Patent: Nov. 17, 2015

(54) METHOD AND APPARATUS FOR CONFIGURING AN IMAGE PRODUCTION DEVICE

(75) Inventor: Paul Siddle, Redbourn (GB)

(73) Assignee: Xerox Corporation, Norwalk, CT (US)

( * ) Notice: Subject to any disclaimer, the term of this patent is extended or adjusted under 35 U.S.C. 154(b) by 2005 days.

(21) Appl. No.: 12/251,836

(22) Filed: Oct. 15, 2008

(65) Prior Publication Data

US 2010/0091316 A1    Apr. 15, 2010

(51) Int. Cl.
*G06F 15/00* (2006.01)
*H04N 1/32* (2006.01)
*H04N 1/00* (2006.01)
*H04N 1/44* (2006.01)

(52) U.S. Cl.
CPC ....... *H04N 1/32144* (2013.01); *H04N 1/00331* (2013.01); *H04N 1/00334* (2013.01); *H04N 1/00336* (2013.01); *H04N 1/00355* (2013.01); *H04N 1/00968* (2013.01); *H04N 1/4433* (2013.01); *H04N 1/0036* (2013.01); *H04N 1/00363* (2013.01); *H04N 1/00371* (2013.01); *H04N 2201/0082* (2013.01); *H04N 2201/0091* (2013.01); *H04N 2201/0093* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 4,281,921 A * | 8/1981 | Van Auken | 355/77 |
| 7,806,315 B2 * | 10/2010 | Matsumura | 235/375 |
| 2003/0236973 A1 * | 12/2003 | Nelson et al. | 713/2 |
| 2005/0086328 A1 * | 4/2005 | Landram et al. | 709/220 |
| 2006/0285126 A1 * | 12/2006 | Braswell et al. | 358/1.1 |
| 2007/0139683 A1 * | 6/2007 | Wegeng et al. | 358/1.13 |
| 2009/0323133 A1 * | 12/2009 | Koch et al. | 358/474 |

* cited by examiner

*Primary Examiner* — Helen Q Zong
(74) *Attorney, Agent, or Firm* — Ronald E. Prass, Jr.

(57) ABSTRACT

A method and apparatus for configuring an image production device is disclosed. The method may include receiving a signal to scan a document containing one or more coded objects, scanning the object coded document, decoding the one or more coded objects from the scanned object coded document into feature identification data, matching the feature identification data to one or more corresponding image production device features, and enabling the one or more corresponding image production device features on the image production device.

18 Claims, 4 Drawing Sheets

METHOD AND APPARATUS FOR CONFIGURING AN IMAGE PRODUCTION DEVICE

BACKGROUND

Disclosed herein are a method and apparatus for configuring an image production device.

To increase the efficiency of a supply chain, it is advantageous to ship only one manufactured product for multiple sold products (i.e., customer end items). In conventional supply chains, multiple products, such as image production devices, are shipped from a manufacturer or distributer for multiple end items that contain different features (e.g., different speeds, fax enabled, software features, print drivers, security features and scan to e-mail features, etc.).

However, this process is costly as it requires a vendor, distributer, or manufacturer to carry a large, space consuming, and costly inventory of devices to meet customers' demands for specific devices with specific features. Alternatively, the manufacturer may customize each machine for each customer (or a majority of their customers) which is slow, time consuming, and costly.

SUMMARY

A method and apparatus for configuring an image production device is disclosed. The method may include receiving a signal to scan a document containing one or more coded objects, scanning the object coded document, decoding the one or more coded objects from the scanned object coded document into feature identification data, matching the feature identification data to one or more corresponding image production device features, and enabling the one or more corresponding image production device features on the image production device.

DETAILED DESCRIPTION

Figure 1:
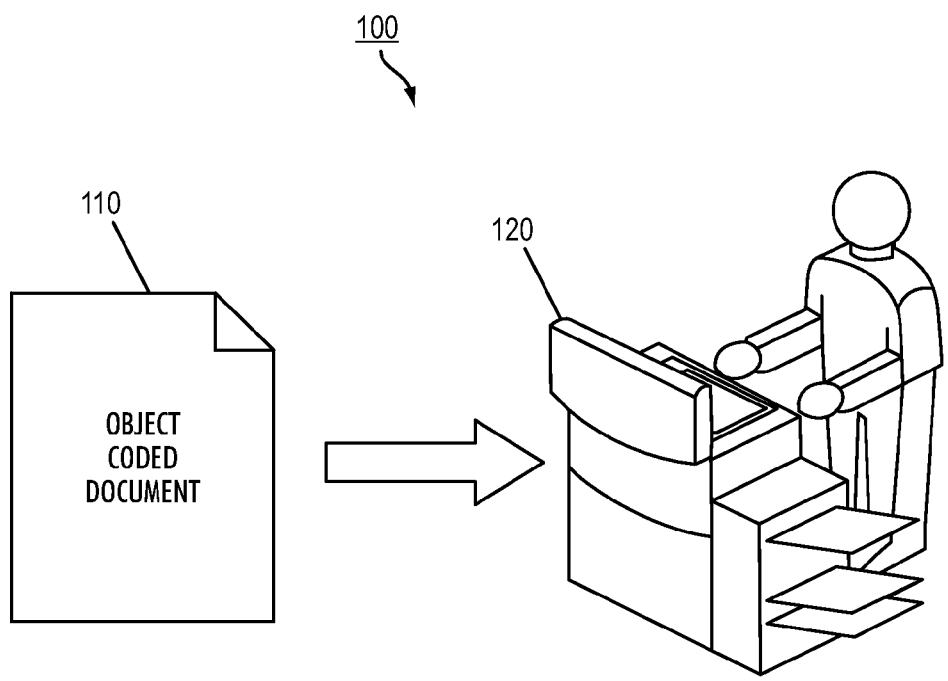
FIG. 1 is an exemplary diagram of an image production environment in accordance with one possible embodiment of the disclosure.

Aspects of the embodiments disclosed herein relate to a method and apparatus for configuring an image production device.

The disclosed embodiments may include a method for configuring an image production device. The method may include receiving a signal to scan a document containing one or more coded objects, scanning the object coded document, decoding the one or more coded objects from the scanned object coded document into feature identification data, matching the feature identification data to one or more corresponding image production device features, and enabling the one or more corresponding image production device features on the image production device.

The disclosed embodiments may further include an image production device that may include a scanner, and a configuration management unit that receives a signal to scan a document containing one or more coded objects, wherein the scanner scans the object coded document, and the configuration management unit decodes the one or more coded objects from the scanned object coded document into feature identification data, matches the feature identification data to one or more corresponding image production device features, and enables the one or more corresponding image production device features on the image production device.

The disclosed embodiments may further include computer-readable medium storing instructions for controlling a computing device for configuring in an image production device. The instructions may include receiving a signal to scan a document containing one or more coded objects, scanning the object coded document, decoding the one or more coded objects from the scanned object coded document into feature identification data, matching the feature identification data to one or more corresponding image production device features, and enabling the one or more corresponding image production device features on the image production device.

The disclosed embodiments may concern a method of user-configuration of an image production device. In this manner, an image production device may be delivered with all of the additional or optional features included, but not enabled. The user may perform a scan of a document that includes coded objects that represent the purchased or included additional features to enable those features.

This process alleviates the problem of having to ship and maintain image production devices or other products having multiple configurations of products in the supply chain. More products in the supply chain increases inventory costs (paying for warehouse space) and reduces cashflow (cash tied up in inventoried products). More products in supply chain also increase the time to delivery to the customer due to specific configuration availability (custom order fulfillment). This process may also solve the problem of self upgrade when the customer has a firewall installed.

In particular, the process may utilize a scanner to scan in a coded object, such as a barcode, a data glyph, a pattern, text, etc. The coded object may then be authenticated using traditional methods (e.g., RSA keys, hologram, code, etc. (RSA is an acronym for the last names of three people that developed it)), the image production device may then enable the purchased optional features. The user may obtain the coded object in many ways, such as along with receiving the image production device, by mail, by e-mail, by fax, by download, or other known or future communication methods. The received coded objects may be provided on media or printed out onto media, such as paper. The media may be scanned and the coded objects may be decoded to identify the optional features. The optional features may then be enabled on the image production device.

The image production device configuration that is shipped to the user may be the lowest featured product of the platform. To avoid security breaches, such as having multiple uses of the coded object on unauthorized products, security features may be implemented into the process. For example, the coded object may be printed in a manner such that when it is scanned, the coded object no longer will be accepted, such as being printed with a "disappearing ink," code that identifies the one or more products that may be authorized, a deactivation mode (e.g., when the machine is registered on-line the unauthorized features are automatically deactivated), etc.

As such, when the coded object is scanned by the scanner and exposed to an additional lower-level product, the scanner will not detect or reject the coded object and not enable the corresponding features. For example, with regard to the disappearing ink, only if the ink is above a certain reflectance will the optional features be enabled. The process may involve tuning the coded objects to the frequency of the scanner, for example. The frequency may be chosen such that office lighting and normal natural light will not erase the ink.

FIG. 1 is an exemplary diagram of an image production environment 100 in accordance with one possible embodiment of the disclosure. The image production environment 100 may include an object coded document 110 that may be and processed by an image production device 120.

The object coded document 110 may be any document that contains coded objects, such as barcodes, data glyphs, patterns, text, etc. that may be scanned, read, interpreted, decoded and/or understood by the image production device 120. The object coded document 110 may be provided to the user through one of delivery of the image production device to the user, by e-mail, by mail, or by download from an Internet website, for example.

The image production device 120 may be any device that may be capable of printing documents, including a printer, a copier/printer, an office copier/printer, a high-capacity copier/printer, a commercial copier/printer, a facsimile/printer device, or a multi-function device, for example.

Figure 2:
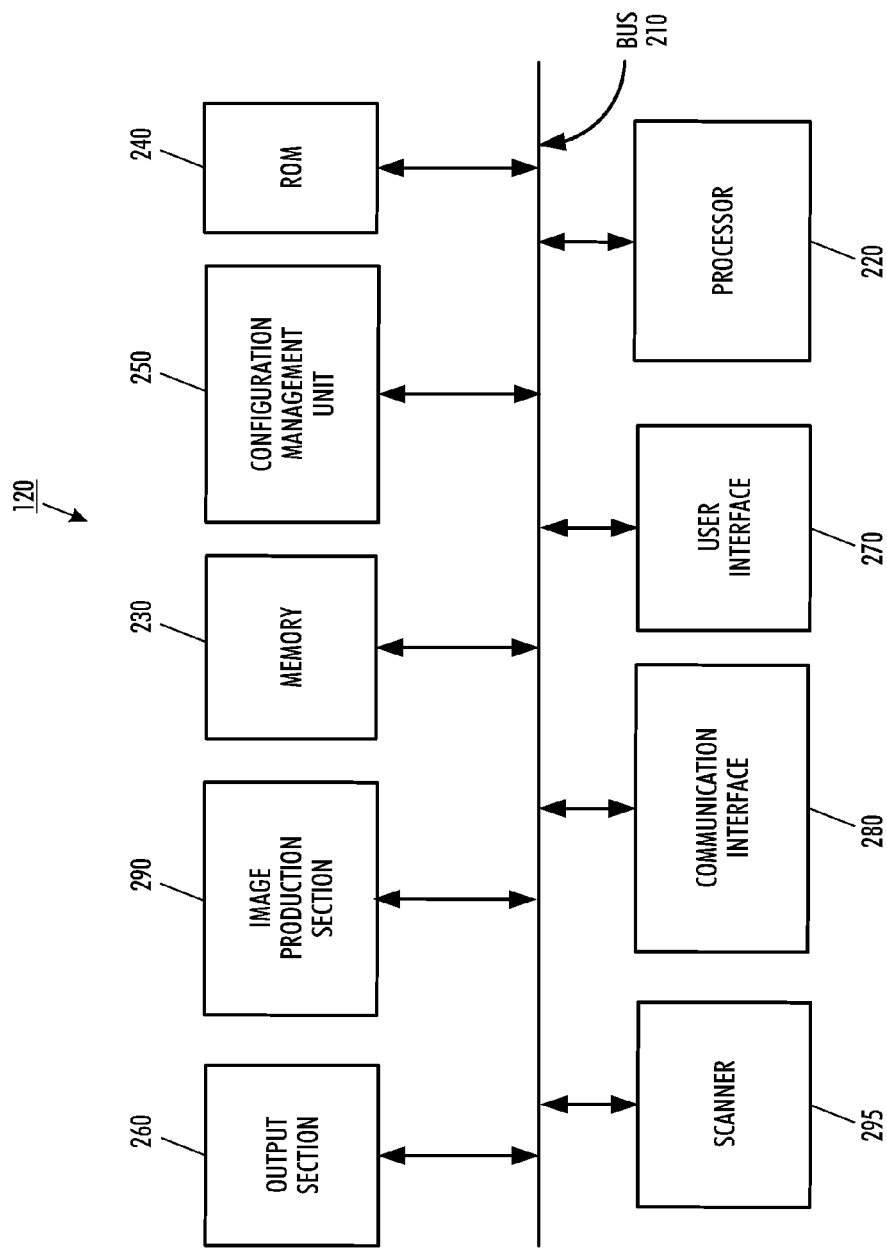
FIG. 2 is an exemplary block diagram of an image production device in accordance with one possible embodiment of the disclosure.

FIG. 2 is an exemplary block diagram of an image production device 120 in accordance with one possible embodiment of the disclosure. The image production device 120 may include a bus 210, a processor 220, a memory 230, a read only memory (ROM) 240, a configuration management unit 250, an output section 260, a user interface 270, a communication interface 280, an image production section 290, and a scanner 295. Bus 210 may permit communication among the components of the image production device 120.

Processor 220 may include at least one conventional processor or microprocessor that interprets and executes instructions. Memory 230 may be a random access memory (RAM) or another type of dynamic storage device that stores information and instructions for execution by processor 220. Memory 230 may also include a read-only memory (ROM) which may include a conventional ROM device or another type of static storage device that stores static information and instructions for processor 220.

Communication interface 280 may include any mechanism that facilitates communication via a network. For example, communication interface 280 may include a modem. Alternatively, communication interface 280 may include other mechanisms for assisting in communications with other devices and/or systems.

ROM 240 may include a conventional ROM device or another type of static storage device that stores static information and instructions for processor 220. A storage device may augment the ROM and may include any type of storage media, such as, for example, magnetic or optical recording media and its corresponding drive.

User interface 270 may include one or more conventional mechanisms that permit a user to input information to and interact with the image production unit 100, such as a keyboard, a display, a mouse, a pen, a voice recognition device, touchpad, buttons, etc., for example. Output section 260 may include one or more conventional mechanisms that output image production documents to the user, including output trays, output paths, finishing section, etc., for example. The image production section 290 may include an image printing section, a scanner, a fuser section, a toner section, etc., for example.

Scanner 295 may represent any type of scanner that may be used in the image production device 120 that may scan documents, images, coded objects, etc. and produce images, read the coded objects (such as bar codes), etc., for example, from the scanned documents. For example, scanner 295 may be a flatbed scanner, sheetfed scanner, slide scanner, drum scanner, handheld scanner, etc.

The image production device 120 may perform such functions in response to processor 220 by executing sequences of instructions contained in a computer-readable medium, such as, for example, memory 230. Such instructions may be read into memory 230 from another computer-readable medium, such as a storage device or from a separate device via communication interface 280.

The image production device 120 illustrated in FIGS. 1-2 and the related discussion are intended to provide a brief, general description of a suitable communication and processing environment in which the disclosure may be implemented. Although not required, the disclosure will be described, at least in part, in the general context of computer-executable instructions, such as program modules, being executed by the image production device 120, such as a communication server, communications switch, communications router, or general purpose computer, for example.

Generally, program modules include routine programs, objects, components, data structures, etc. that perform particular tasks or implement particular abstract data types. Moreover, those skilled in the art will appreciate that other embodiments of the disclosure may be practiced in communication network environments with many types of communication equipment and computer system configurations, including personal computers, hand-held devices, multi-processor systems, microprocessor-based or programmable consumer electronics, and the like.

Figure 3:
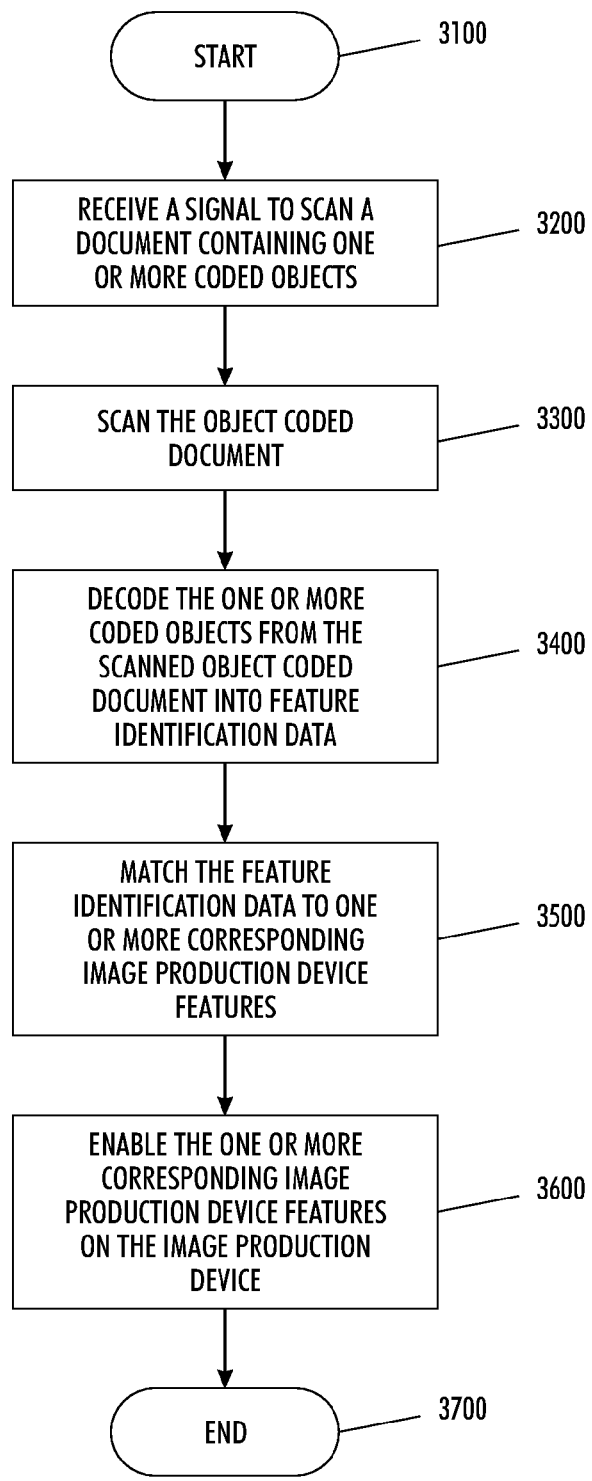
FIG. 3 is a flowchart of an exemplary image production device configuration process in accordance with one possible embodiment of the disclosure.

For illustrative purposes, the operation of the configuration management unit 250 and the exemplary configuration process are described in FIG. 3 in relation to the diagrams shown in FIGS. 1-2.

FIG. 3 is a flowchart of an exemplary configuring process in accordance with one possible embodiment of the disclosure. The process may begin at step 3100, and continues to step 3200 where the configuration management unit 250 may receive a signal to scan a document 110 containing one or more coded objects. At step 3300, the scanner 295 may scan the object coded document 110.

At step 3400, the configuration management unit 250 may decode the one or more coded objects from the scanned object coded document 110 into feature identification data. At step 3500, the configuration management unit 250 may match the feature identification data to one or more corresponding image production device features. The one or more image production device features may be printing capabilities, fax capabilities, scanning capabilities, copying capabilities, software features, different speeds, print drivers, security features, or scan-to-e-mail features, for example.

At step 3600, the configuration management unit 250 may enable the one or more corresponding image production device features on the image production device 120. Thus, the image production device 120 may be shipped to a user with a plurality of image production device features that are not enabled, and one or more of the image production device features may be enabled upon the coded objects being scanned by the scanner. The process may then go to step 3700, and end.

The configuration management unit 250 may also authenticate the one or more coded objects before allowing the image production device features to be enabled. If the coded objects can be authenticated, the configuration management unit 250 may enable the one or more corresponding image production device features on the image production device 120. Otherwise, if the coded objects cannot be authenticated, the configuration management unit 250 may not enable the one or more corresponding image production device features on the image production device 120.

Figure 4:
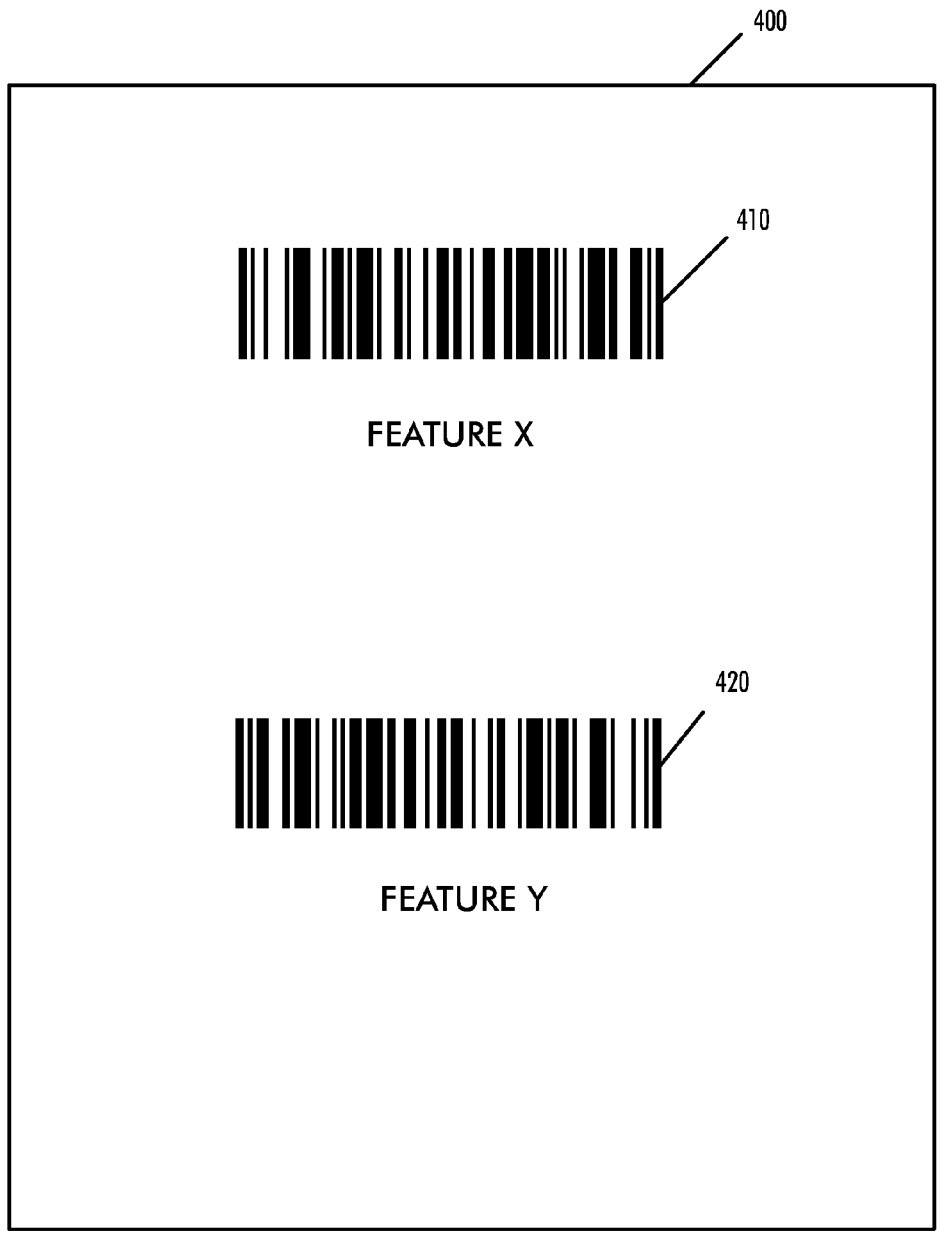
FIG. 4 is an example of an object coded document in accordance with one possible embodiment of the disclosure.

FIG. 4 is an example of an object coded document 110 in accordance with one possible embodiment of the disclosure. The object coded document 110 may include one or more coded objects 410, 420 that correspond to additional or optional features on the image production device 120. The object coded document 110 may be printed on any media, including plain paper, water marked paper, security-enhanced paper (i.e., paper that includes one or more security features), light sensitive media, etc.

While the coded objects 410, 420 are shown to be barcodes, this is merely illustrative. As stated above, the coded objects 510, 520 may be barcodes, data glyphs, patterns, text, or any other type of coded object known to one of skill in the art. The coded object 410, 420, may also include an authentication mechanism, such as a code, image, hologram, RSA key, or any other authentication mechanism known to one of skill in the art.

The coded objects 410, 420 may be configured in a manner such that the one or more corresponding image production device features are enabled from the scanned coded object only a predetermined number of times. Thus, the coded objects 410, 420 may be printed with a "disappearing ink," a code that identifies the one or more products that may be authorized, a deactivation mode (e.g., when the machine is registered on-line the unauthorized features are automatically deactivated), etc., for example. In this manner, the coded objects 410, 420 may only enable features once, or may be able to only be able to enable features a predetermined number of times (i.e., a number of times corresponding to the number of image production devices 120 on which the user has paid to have the particular feature enabled, for example).

Embodiments as disclosed herein may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hard wired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein. It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for configuring an image production device having a scanner and a configuration management unit, comprising:
   receiving a signal to scan a document containing one or more coded objects using the configuration management unit;
   scanning the object coded document using the scanner;
   using the configuration management unit:
   decoding the one or more coded objects from the scanned object coded document into feature identification data;
   matching the feature identification data to one or more corresponding image production device features; and
   enabling the one or more corresponding image production device features on the image production device,
   wherein the one or more coded objects are encoded such that the one or more corresponding image production device features are enabled from the scanned coded object only a predetermined number of times, and
   wherein the one or more coded objects are encoded with an authentication mechanism and the configuration management unit authenticates the one or more coded objects and enables the one or more corresponding image production device features on the image production device if the one or more coded objects can be authenticated, otherwise the configuration management unit does not enable the one or more corresponding image production device features on the image production device if the one or more coded objects cannot be authenticated.

2. The method of claim 1, wherein the document containing one or more coded objects is provided to the user through one of delivery of the image production device, by e-mail, by mail, and by download from an Internet website.

3. The method of claim 1, wherein the one or more coded objects are one of a barcode, a data glyph, a pattern, and text.

4. The method of claim 1, wherein the image production device is shipped with a plurality of image production device features that are not enabled, and one or more of the image production device features are enabled upon the coded objects being scanned.

5. The method of claim 1, wherein the one or more image production device features are at least one of printing capabilities, fax capabilities, scanning capabilities, copying capabilities, software features, different speeds, print drivers, security features, and scan-to-e-mail features.

6. The method of claim 1, wherein the image production device is one of a printer, a copier/printer, an office copier/printer, a high-capacity copier/printer, a commercial copier/printer, a facsimile/printer device, and a multi-function device.

7. An image production device, comprising:
   a scanner; and a configuration management unit that receives a signal to scan a document containing one or more coded objects, wherein the scanner scans the object coded document, and the configuration management unit decodes the one or more coded objects from the scanned object coded document into feature identification data, matches the feature identification data to one or more corresponding image production device features, and enables the one or more corresponding image production device features on the image production device, wherein the one or more coded objects are encoded such that the one or more corresponding image production device features are enabled from the scanned coded object only a predetermined number of times, and wherein the one or more coded objects are encoded with an authentication mechanism and the configuration management unit authenticates the one or more coded objects and enables the one or more corresponding image production device features on the image production device if the one or more coded objects can be authenticated, otherwise the configuration management unit does not enable the one or more corresponding image production device features on the image production device if the one or more coded objects cannot be authenticated.

8. The image production device of claim 7, wherein the document containing one or more coded objects is provided to the user through one of delivery of the image production device, by e-mail, by mail, and by download from an Internet website.

9. The image production device of claim 7, wherein the one or more coded objects are one of a barcode, a data glyph, a pattern, and text.

10. The image production device of claim 7, wherein the image production device is shipped to with a plurality of image production device features that are not enabled, and one or more of the image production device features are enabled upon the coded objects being scanned by the scanner.

11. The image production device of claim 7, wherein the one or more image production device features are at least one of printing capabilities, fax capabilities, scanning capabilities, copying capabilities, software features, different speeds, print drivers, security features, and scan-to-e-mail features.

12. The image production device of claim 7, wherein the image production device is one of a printer, a copier/printer, an office copier/printer, a high-capacity copier/printer, a commercial copier/printer, a facsimile/printer device, and a multi-function device.

13. A non-transitory computer-readable medium storing instructions for controlling a computing device for configuring an image production device, the instructions comprising:

receiving a signal to scan a document containing one or more coded objects;

scanning the object coded document;

decoding the one or more coded objects from the scanned object coded document into feature identification data;

matching the feature identification data to one or more corresponding image production device features; and enabling the one or more corresponding image production device features on the image production device wherein the one or more coded objects are encoded such that the one or more corresponding image production device features are enabled from the scanned coded object only a predetermined number of times, and wherein the one or more coded objects are encoded with an authentication mechanism and the configuration management unit authenticates the one or more coded objects and enables the one or more corresponding image production device features on the image production device if the one or more coded objects can be authenticated, otherwise the configuration management unit does not enable the one or more corresponding image production device features on the image production device if the one or more coded objects cannot be authenticated.

14. The non-transitory computer-readable medium of claim 13, wherein the document containing one or more coded objects is provided to the user through one of delivery of the image production device, by e-mail, by mail, and by download from an Internet website.

15. The non-transitory computer-readable medium of claim 13, wherein the one or more coded objects are one of a barcode, a data glyph, a pattern, and text.

16. The non-transitory computer-readable medium of claim 13, wherein the image production device is shipped with a plurality of image production device features that are not enabled, and one or more of the image production device features are enabled upon the coded objects being scanned.

17. The non-transitory computer-readable medium of claim 13, wherein the one or more image production device features are at least one of printing capabilities, fax capabilities, scanning capabilities, copying capabilities, software features, different speeds, print drivers, security features, and scan-to-e-mail features.

18. The non-transitory computer-readable medium of claim 13 wherein the image production device is one of a printer, a copier/printer, an office copier/printer, a high-capacity copier/printer, a commercial copier/printer, a facsimile/printer device, and a multi-function device.

* * * * *